United States Patent

Morgan et al.

(10) Patent No.: US 6,738,849 B2
(45) Date of Patent: May 18, 2004

(54) REAL-TIME COMMUNICATIONS FOR SPEEDING UP PACKET TRANSMISSION

(76) Inventors: Milton E. Morgan, P.O. Box 1085, Santa Barbara, CA (US) 93102; Claire P. Liboiron, P.O. Box 1085, Santa Barbara, CA (US) 93102

( * ) Notice: Subject to any disclaimer, the term of this patent is extended or adjusted under 35 U.S.C. 154(b) by 498 days.

(21) Appl. No.: 09/842,279

(22) Filed: Apr. 24, 2001

(65) Prior Publication Data

US 2002/0056017 A1 May 9, 2002

Related U.S. Application Data

(60) Provisional application No. 60/230,129, filed on Sep. 5, 2000.

(51) Int. Cl.$^7$ .............................................. G06F 13/00
(52) U.S. Cl. ....................................... 710/264; 710/48
(58) Field of Search ................................ 710/305, 260, 710/264, 47, 48, 46; 713/501, 600

(56) References Cited

U.S. PATENT DOCUMENTS

| | | | | | |
|---|---|---|---|---|---|
| 5,247,617 | A | * | 9/1993 | Olson | 710/46 |
| 5,293,486 | A | * | 3/1994 | Jordan et al. | 710/220 |
| 5,560,017 | A | * | 9/1996 | Barrett et al. | 710/260 |
| 5,590,316 | A | * | 12/1996 | Hausauer | 713/501 |
| 5,887,199 | A | * | 3/1999 | Ofer et al. | 710/65 |
| 6,065,070 | A | * | 5/2000 | Johnson | 710/22 |
| 6,173,343 | B1 | * | 1/2001 | Delorme | 710/48 |
| 6,182,165 | B1 | * | 1/2001 | Spilo | 710/22 |
| 6,243,785 | B1 | * | 6/2001 | Lowe et al. | 710/260 |
| 6,523,085 | B1 | * | 2/2003 | Hodges et al. | 711/112 |

* cited by examiner

Primary Examiner—Glenn A. Auve

(57) ABSTRACT

Improved transmission speed of data between computer systems is achieved by utilizing highest priority interrupts assigned to non-communication devices to control communications. In particular, the normally highest priority timer interrupts are used to poll communication buffers to determine whether data needs to be sent or received with such polling replacing the use of the interrupts typically associated with communication devices.

1 Claim, 5 Drawing Sheets

"BEFORE"

"AFTER"

=> INCREASED I/O DEVICE POLLING FREQUENCY

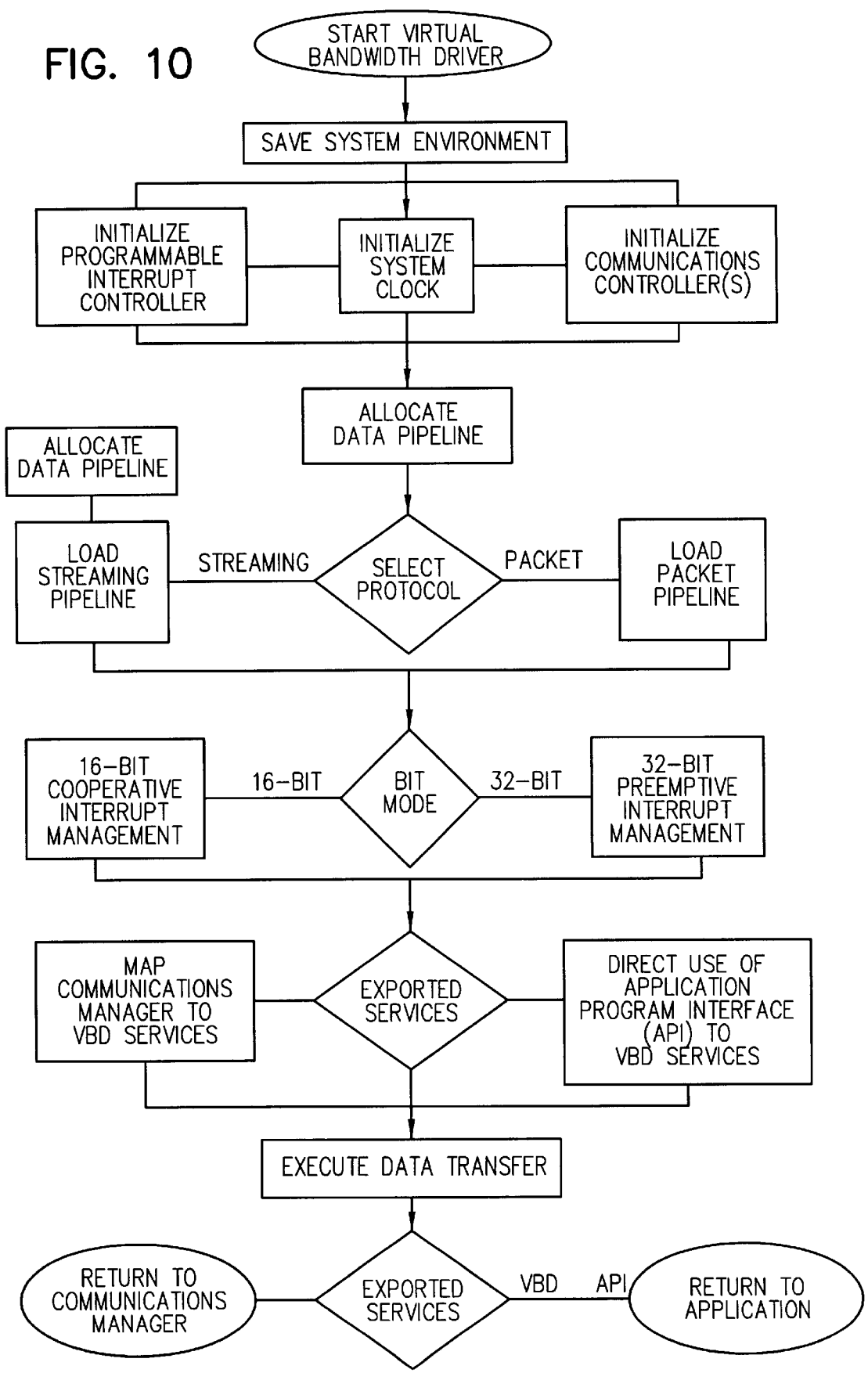

REAL-TIME COMMUNICATIONS FOR SPEEDING UP PACKET TRANSMISSION

RELATION TO ANOTHER APPLICATION

The benefit of the filing date of U.S. provisional application No. 60/230,129 filed Sep. 5, 2000 is claimed.

The present invention relates to novel methods and apparatus for increasing the speed of data transfer between computers.

GLOSSARY

API—Application Programming Interface
CONFIGMG—Configuration Manager
CPU—Central Processing Unit
DSL—Digital Subscriber Line
Event Signal—Interrupt
Granularity—A period of time within which events can be processed. When interrupts can be processed by a handler within 0.000001 seconds, the term "microsecond granularity" is applicable.
Handler—Software that takes control over interrupt and processor exceptions. Technically referenced to as an interrupt service routine (ISR). Interrupts controlled by handlers can be classified into 3 categories: 1—Hardware interrupts (caused by external hardware); 2—software interrupts (caused by executing an TNT instruction); ; 3—Processor exception (generated by a processor when it detects certain programming errors).
I/O—Input/Output
Interrupt Latency—The time it takes to service an interrupt
IRQ—Interrupt Request
LAN—Local Area Network
Pipeline—A buffer or cache where data is staged for transfer. The pipeline acts as an extension of typically one megabyte to the FIFO buffer. The additional memory is taken from RAM.
PIT—Programmable Interrupt Timer
UART—Universal Asynchronous Receiver Transmitter
UIOH—UART Input Output Handler
VxD—Virtual Device Driver
VBD—Virtual Bandwidth Driver
VCD—Virtual Communications Device
VCOMM—Virtual Communications Manager
VMM—Virtual Machine Manager
VPICD—Virtual Programmable Interrupt Controller Device Driver
VTD—Virtual Timer Device Driver

BACKGROUND OF THE INVENTION

Recent years have seen substantial advancement in regard to the transmission speeds of modems and network cards. However, such increases in transmission speeds have not always been accompanied by corresponding increases in actual communication speeds between computers. As an example, even though modems purportedly having transmission speeds of 56 kbps are available, Microsoft has issued technical reports warning Windows users that communication speeds exceeding 19200 bps may cause loss of data and degrade multi-tasking operations.

In trying to understand why the actual speed of data throughput often does not match the transmission speed of the method and medium connecting computers, i.e., the pipeline, it is important to realize that data must be transferred to and from the pipeline at least as fast as data is transferred over the pipeline in order to maximize throughput. Throughput is often limited by the speed at which such data transfers can be accomplished within a computer. With transmission speeds equal to or greater than 9600 bps, data appears at the end of the pipeline at intervals of less than 1 millisecond. Although the use of buffers can decrease the instantaneous speed at which data in the pipeline needs to be processed, the average response time of a system must be less than 1 millisecond if continuous high speed data transmission is to be supported. Obtaining such a quick average response time is difficult to accomplish, particularly when using a multi-tasking operating system such as Microsoft Windows.

At least part of the difficulty in achieving fast response times is related to the manner in which communications are typically handled. In many systems, I/O devices generate event signals/interrupts when data is sent or received. When such an interrupt occurs, execution of routines for transferring data to or from the I/O device takes place. However, it is not uncommon for the interrupt latency (i.e., the time required for control to be switched between the current process and the interrupt handler) of a computer running Microsoft Windows to exceed 300 milliseconds. Attempts to increase data transmission speed by using buffers to store data that is to be transferred have been made. However, as data transfer must still be accomplished after control is switched, such systems clearly cannot provide the sub-microsecond response times required if buffers are not in use; and they often cannot respond quickly enough even when buffers are in use.

In short, a major bottleneck in transferring data between computers is attributable to the limitations on throughput imposed by the computer software/hardware. Maximum throughput can be attained only if the (typically) serial port is operated at saturation. Without port saturation, data cannot be moved in or out fast enough to sustain maximum bandwidth data transfer rates.

Whether or not they have been previously recognized, slowdowns in data communications related to the speed at which data can be transferred to and from a communications pipeline have existed and continue to exist. Thus, there is a continuing need for improved methods and devices allowing maximum throughput of data through transmission channels to be achieved.

SUMMARY OF THE INVENTION

There has now been invented and disclosed herein a novel approach to data transmission which provides significantly higher transmission speeds than do current approaches to this problem. An implementation of this new and novel technology is identified in this document as a Virtual Bandwidth Driver (VBD). The VBD is premised on the finding that, with a faster clock interrupt frequency and higher priority for communication controllers, a computer system's communication resource management can sustain the maximum throughput of data staged in a buffer memory, i.e., pipeline, with minimum multi-tasking degradation, regardless of protocol, media, or connection type. Increased transmission speed is also obtained by transferring data to and from the pipeline in blocks of (typically) 4096 bits rather than employing the conventional one bit at a time approach. This (1) reduces herky jerky effects in video and distortion in audio; (2) improves multitasking; (3) increases communication throughput; and (4) facilitates lossless data transmission.

VBD functionality is embedded in a computer system's operating environment by adding software that controls system clock interrupt frequency and interrupt processing, data pipelining, and communication resources. As a result, VBD so manages interrupt latency as to provide granularity in the microsecond range required for high speed data transmission.

In reaching this goal, VBD takes advantage of the fact that the speed of data transmission between computer systems can be increased by utilizing the highest priority interrupts assigned to non-communication devices to control communications. In particular, timer interrupts, which have the highest priority, are used to poll communication buffers to determine whether data needs to be sent or received with such polling replacing the use of data transfer interrupts typically associated with communication devices.

Also, VBD is capable of recognizing that an interrupt which affects the rate of data transfer is not operating at its highest frequency. In this instance VBD so increases that frequency as to speed up data transfer while maintaining "normal operation" of the involved system. For example, in one embodiment of the invention, an I/O handler which polls one or more I/O devices such as Universal Asynchronous Receiver-Transmitters ("UARTS") used with serial ports is mapped to the interrupt of a programmable interrupt timer ("PIT") such as the system clock after increasing the frequency at which the PIT/clock generates interrupts.

This results in the lower priority I/O device interrupts being replaced with the I/O device being serviced at the frequency with which the system clock can generate interrupts.

Conventionally, moderate increases in system clock frequency are employed to facilitate communication throughput. In contrast, in implementing the present invention, the clock frequency is increased to a multiple of the base frequency as required by a desired communication speed, thereby sustaining the maximum obtainable bandwidth.

Still another advantage of VBD is that Windows (as one operating system example) is more stable when VBD has been implemented. Specifically, when serial communications devices are used at the maximum UART speed of 115,200 bps, changing tasks repeatedly will cause a fatal Windows error. However, this does not occur after VBD is implemented. In summary, the conventional interrupt activity involved with serial high performance that can cause system instability is removed by VBD.

The advantages, objects, and features of the present invention will be apparent to the reader from the foregoing and the appended claims and as the ensuing detailed description of the invention proceeds in conjunction with the accompanying drawing.

BRIEF DESCRIPTION OF THE DRAWINGS

FIG. 10 shows, in flow diagram form, the operation of a WINTEL computer embodying the principles of the present invention.

DETAILED DESCRIPTION OF THE INVENTION

Figure 1:
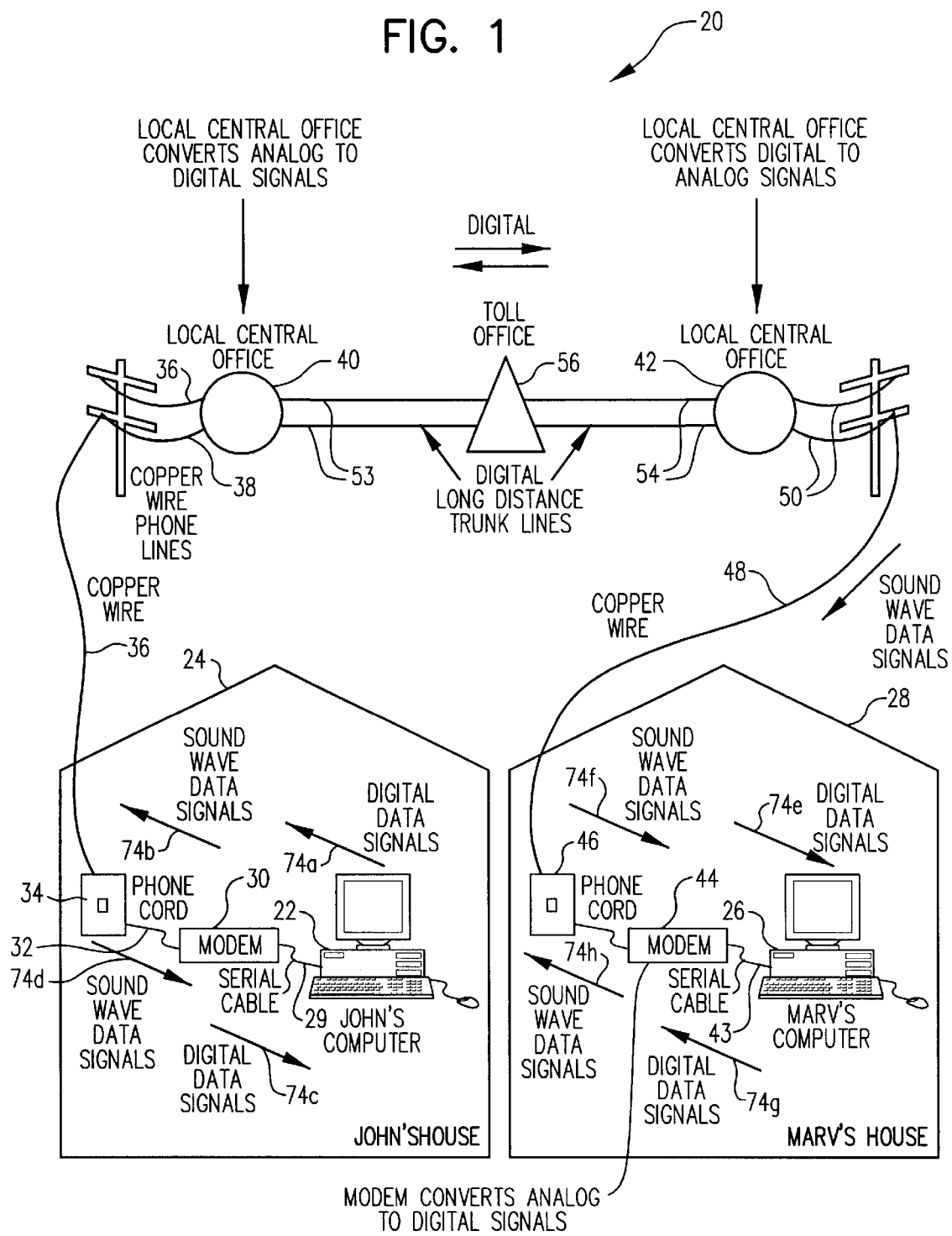
FIG. 1 is a pictorial view of one representative installation which has two conventional personal computers linked by a dial-up telephone circuit; the present invention can be utilized to advantage to speed the transfer of data between the computers.

Referring now to the drawings, FIG. 1 depicts a representative system 20 in which the principles of the present invention can be employed to advantage to speed the transmission of data between a computer 22 at John's house 24 and a computer 26 at Mary's house 28. In this representative system, data is transmitted from computer 22 and received by that computer by way of a pipeline comprising serial cable 29, modem 30, phone cord 32, jack 34, and telephone lines 36, 38, running from John's house to a local central office 40. The computer 26 in Mary's house 28 is similarly connected to a second local central office 42 by a second pipeline comprising serial cable 43, modem 44, phone cord 46, jack 48, and telephone lines 50 and 52. The two central offices 40 and 42 are, in this system, connected to each other through trunk lines 53 and 54 and a toll office 56.

Implementation of the present invention (VBD functionality) in system 20 involves a modification in the operating protocol of computer 22 and a like modification in the operation of computer 26. Only the operation of computer 22 will be described in detail with the understanding that the ensuing discussion is equally applicable to computer 26.

Figure 2:
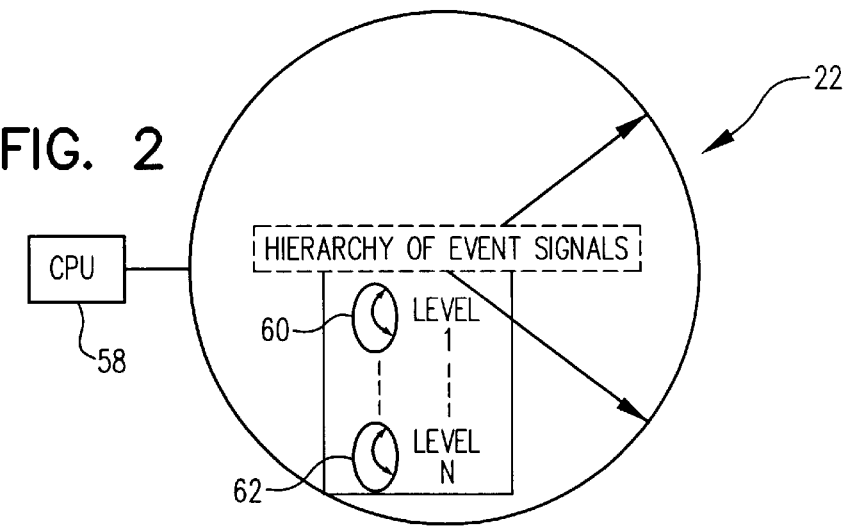
FIG. 2 is a pictorial view of a FIG. 1 computer; this computer has first and second devices capable of generating event signals; the second of these devices is an I/O device.
Figure 3:
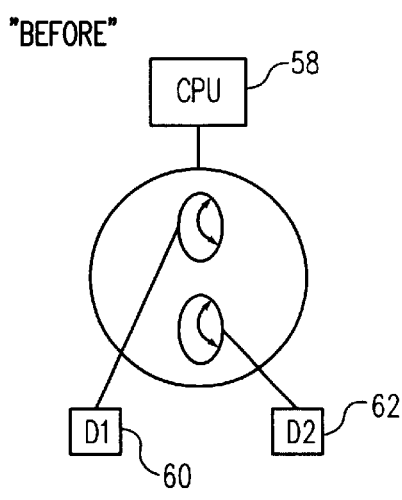
FIG. 3 is a functional block diagram of the conventional, FIG. 1 computer's hardware architecture; this figure shows a computer conventionally programmed to handle event signals on a priority basis; signals generated by the I/O device have a lower priority than the signals generated by the first of the two computer devices.

Referring now to FIGS. 2 and 3, computer 22 has the usual CPU 58 which responds to event signals. The event signals from a non-communications device 60 (level 1) are given priority over signals from a communications device 62 (level N). The communication device will typically be a I/O device.

Figure 4:
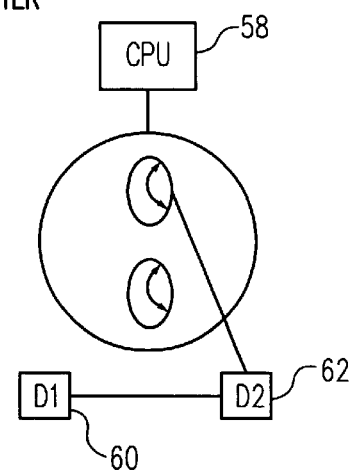
FIG. 4 is a block diagram of the same hardware architecture using VBD to increase data transfer speed in accord with the principles of the present invention while retaining the capability of the computer to respond to event signals generated by the first of the computer devices capable of generating such signals.

The present invention is implemented in computer 22 (see FIGS. 4 and 5) by reprogramming the computer such that data transfers to and from I/O device 62 are given a higher level of priority in the hierarchy of event signals than they would otherwise have. At the same time, computer 22 continues to respond to non-communication signals generated by non-communications device 60.

Figure 5:
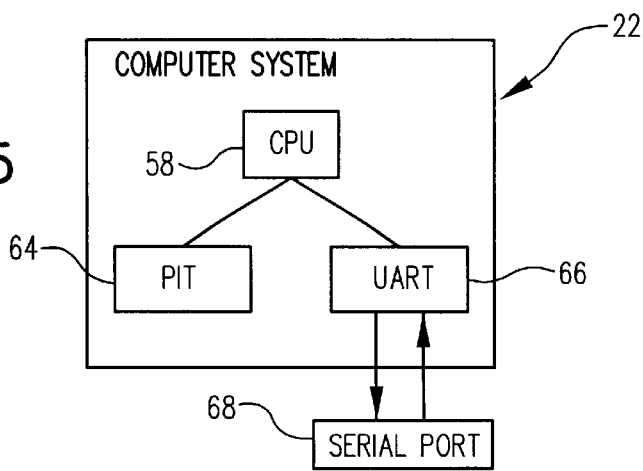
FIG. 5 shows, in more detail, a conventional computer as illustrated in FIG. 3 in which the two event generating devices are: (a) a system clock which is a PIT and an I/O device which is a UART capable of controlling a serial port; in this arrangement the system's clock interrupts are typically given a higher priority than the UART interrupts.

As an example, a personal computer conventionally running a Microsoft Windows operating system will generally include a system clock 64 which is a PIT (non-communications device) and a UART 66 (communications device) for controlling a serial port 68 (FIG. 5). The system clock interrupts are generally given a higher priority than those of the UART.

In accord with the present invention, an event handler for UART 66 input and output (I/O) signals is mapped to PIT 64. This results in the UART (I/O) handler taking advantage of the higher priorities theretofore assigned to the PIT 64 interrupts. Thus, UART I/O handler 66 essentially steps to the front of the line of all interrupt handlers (or at least close to it) so that it executes sooner than it otherwise would. To prevent disruption of the operation of the computer 22 system, the UART I/O handler, in addition to controlling data flow to and from the UART, makes sure that any handler previously mapped to the system clock interrupt (the clock handler) is also executed whenever a clock interrupt ("tick") needs to be serviced.

Figure 6:
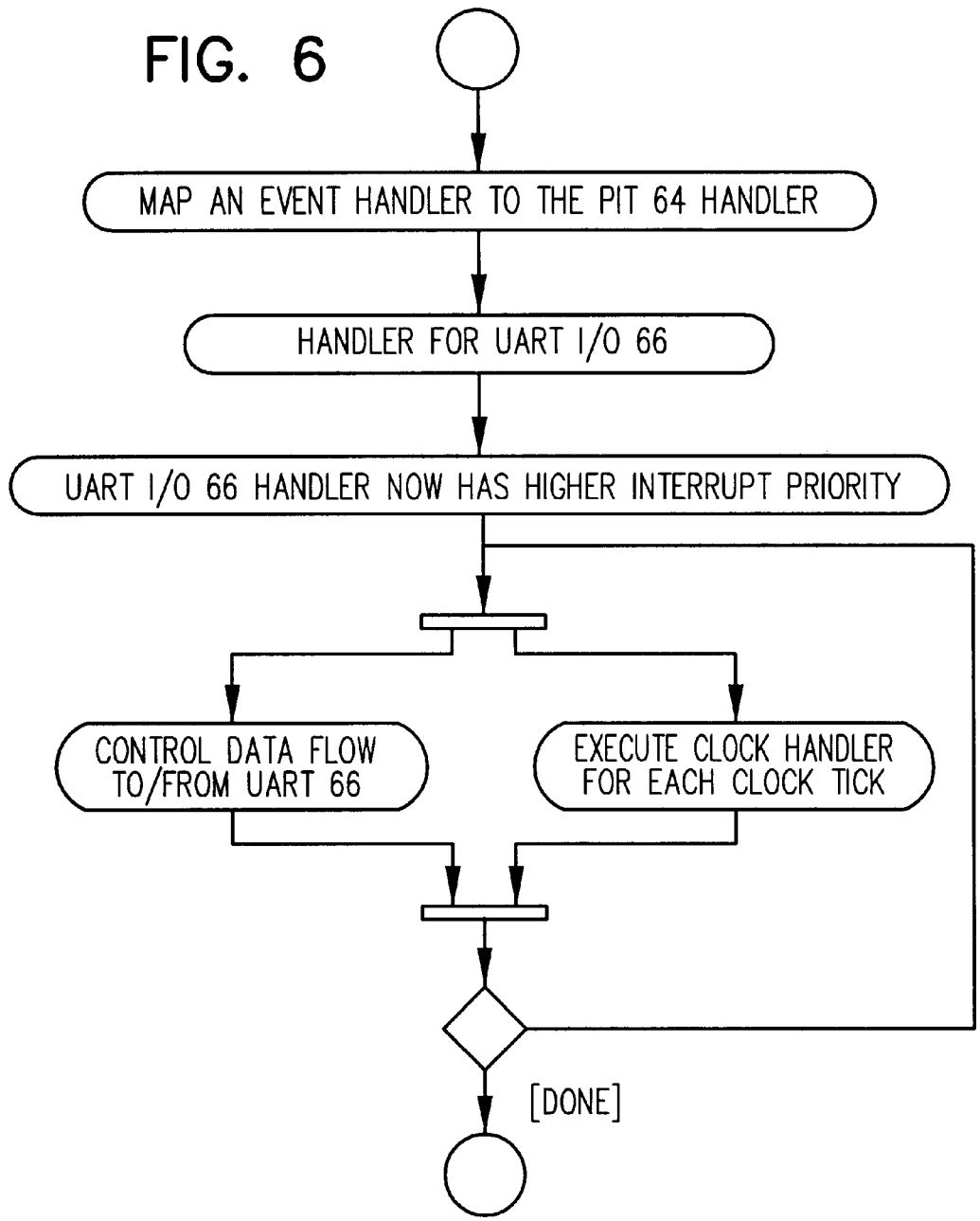
FIG. 6 is a flow diagram which shows how the operation of conventional computer hardware can be controlled in accord with the principles of the present invention to give higher priority to the computer's I/O interrupts and thereby speed up the transfer of data to and from the I/O device.

The foregoing implementation and operation of the present invention in computer 20 is shown in flow diagram form in FIG. 6. First, an event handler is mapped to PIT 64, generating a new handler for UART I/O 66, the new handler having a higher interrupt priority than before. The new handler controls the flow of data to and from UART 66 and also executes a clock handler for each tick of clock 64.

Figure 7:
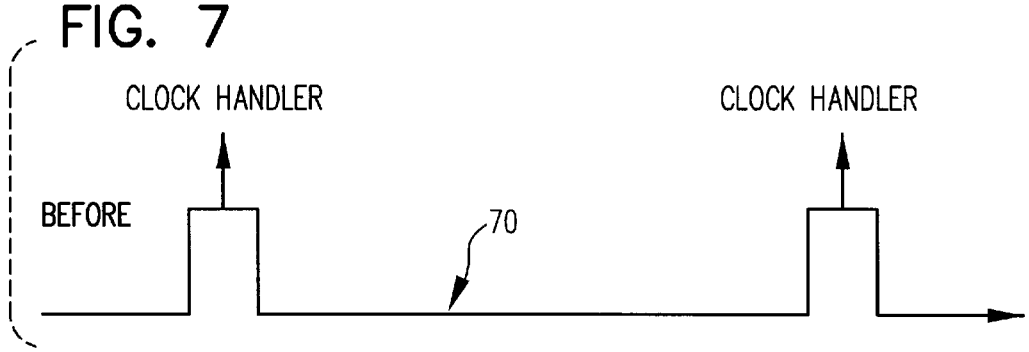
FIG. 7 is a timing diagram for the clock of a representative and conventional computer.

The UART or other communications device handler polls the communication device(s) of computer 22 to see if there is data to be transferred or received (the data is stored in a communications device-associated buffer or "pipeline"). The first non-communication device 62 of system 22 is typically a timer programmed to generate a timer interrupt at a first fixed frequency (reference character 70, FIG. 7). The programming of computer 22 to handle data transfers to and/or from I/O device 62 in a speeded up data transfer mode may advantageously be done such that the timer interrupts are generated at a second fixed frequency which is higher than the first frequency. The higher frequency capabilities of the timer are taken advantage of to poll the I/O device 64 more frequently as shown by trace 72 in FIG. 8.

Figure 8:
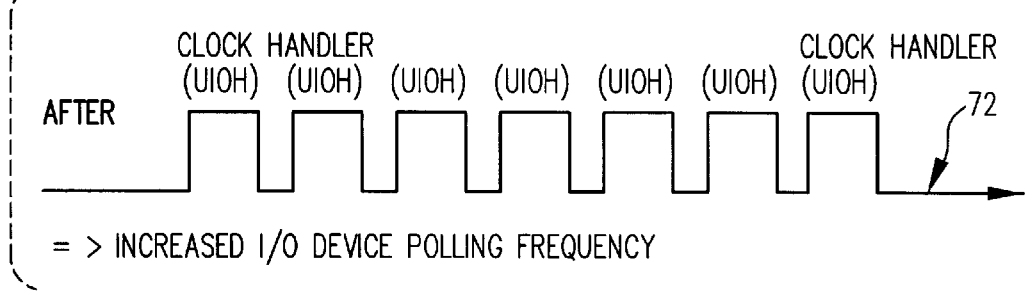
FIG. 8 is a similar diagram for a computer embodying the principles of the present invention.

A higher frequency of the base clock frequency is employed. This results in the highest attainable bandwidth being realized. In order to prevent disruption of computer 22, the UART I/O handler 66 does not call the clock handler for every modified clock tick, but instead keeps track of the number of times the handler is executed and starts execution of the clock handler only at the base clock frequency 70. Although the clock handler should not be executed after every modified clock tick (trace 72) to preserve system stability, the UART I/O handler may be executed after every such more frequent clock tick; e.g., at the increased frequency 72 (FIG. 8). This results in the detection of data to be sent or received being advantageously detected and transferred more frequently.

Figure 9:
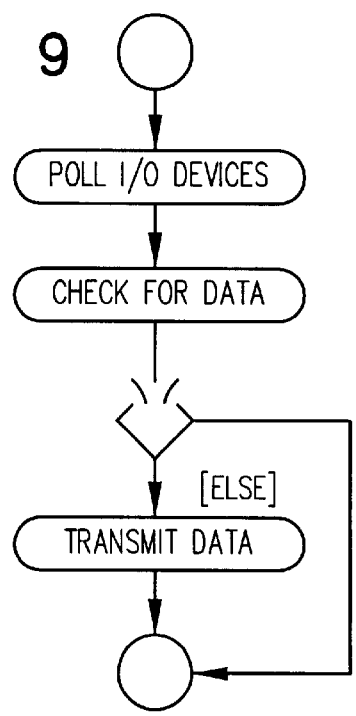
FIG. 9 is a flow diagram for embodiments of the invention in which an I/O handler polls one or more I/O devices at each tick of the system clock to ascertain whether data has been received; the handler also polls a data buffer to see if there is data to transmit.

Preferably, as shown in FIG. 9, the I/O handler will poll the I/O device 62 after every modified clock tick to determine if data has been transmitted or received and will poll the data buffer (not shown) to determine if data is ready to be transmitted or received as indicated by reference character 72 in FIG. 8. In short, the need for data transfer to or from the I/O device 62 is handled by polling; and the increased clock frequency and design of the I/O handler insure that data is transferred to and from the I/O device almost as quickly as it can be received or transmitted.

The application of VBD to 16-bit and 32-bit WINTEL platforms is a representative use of a VBD driver. This application of the invention is described below with reference to FIG. 10.

Virtual Bandwidth Driver (VBD) functionality is embedded in a computer system's operating environment by adding VxD software that controls system clock interrupt frequency as well as communications interrupt processing and resources. Specifically, VBD controls interrupt latency in order to provide granularity in the one microsecond range for high performance communications. With interrupt latency held to the microsecond range, the resulting operating environment is regarded as deterministic. VBD extends Windows, which is not deterministic, by focusing its functional enhancements of the operating environment on communication management. Strict adherence to all software and hardware standards of Microsoft and Intel, respectively, is maintained.

VBD provides sufficient granularity that a computer system's communication resource management can be controlled to sustain the maximum data throughput attainable without multi-tasking degradation.

In the representative WINTEL application mentioned above, VBD functions as follows:
Start Virtual Bandwidth Driver A computer with Windows operating system is first booted up from the computer's hard disk. VBD software is then loaded from either the disk or a network as an extension to the Windows virtual communications manager (VCOMM). A control panel (not shown) informs the user of a successful installation and displays throughput statistics.
Save System Environment VCOMM is the command and control element for all Windows communication resources, e.g., serial ports, parallel port, and universal serial bus (USB). In order to maintain system and VCOMM integrity, the original system clock frequency and communication resource settings and configurations are saved by VBD before changing them. VBD also saves parameters and settings of other Windows virtual device drivers (VxDs), namely:
 VMM—Virtual Machine Manager
 CONFIGMG—Configuration Manager
 VCD—Virtual Communication Device
 VTD—Virtual Timer Device Driver
 VPICD—Virtual Programmable Interrupt Controller Device Driver Since VBD is implemented as a VxD, it can invoke another VxD or be invoked by another VxD. This results in the software extensions being transparent to the operating environment. Although the operating environment has been reconfigured, VBD is not activated until a Windows application requests VxD services.
Initialize Programmable Interrupt Controller The programmable interrupt timer (PIT) hardware in Windows machines has three channels that can generate interrupts at different frequencies. Only Channel 0 is utilized by VBD; this is the highest interrupt priority. While the highest priority interrupt is being serviced, no other lower priority interrupts are serviced, thus allowing VBD to provide advantageous deterministic processing of communications functions.

To accomplish the goal of deterministic processing, a set of Channel 0 count values is so calculated as to correspond to the time required to process data with a universal asynchronous receiver transmitter (UART) at specified port speeds. Since the UART has first in first out (FIFO) memories, the calculation allows for buffering of data to minimize the number of interrupts to be handled. PIT calculations are saved for subsequent reference.

An unmodified Windows system operates the PIT in Mode 3, resulting in square wave rate generator operation. VBD reconfigures Channel 0 to use Mode 2 for pulse rate generator operation. This does not change the basic period or interrupt functionality but, with a counter value equal to one, generates an interrupt clock frequency of 1,193,181 interrupts per second. This is far above the rate of an unmodified Windows system.

VBD does not change the PIT initialization, thus providing for edge-sensitive triggering.

Initialize System Clock

Each personal computer (PC) with an Intel microprocessor uses a system clock for the internal management of date and time, for example to set the clock date and time of the last change to directories and files as well as to issue alarms at specific times. Interrupt frequency of the system clock is controlled by an oscillator that operates at 1.193181 MHz. A counter value equal to zero through 65535 is used to configure the actual frequency.

The ability of VBD to calculate system clock frequency is based on the functionality of the Intel 8253 PIT that is provided with all Intel microprocessor based PCs. As discussed above, the PIT has three channels, and each can generate an interrupt at different frequencies.

Initialize Communications Controller(s)

For dialup communications with a modem a universal asynchronous receiver transmitter (UART) is initialized with these parameters:

Speed—measured in bits per second (bps)

Size—number of bits per byte

Parity—odd, even, or more

Stop Bits—none, one, or two

FIFO Buffer Triggers—one to sixteen

Interrupt Level—three or four

For local area network (LAN) or digital subscriber line (DSL) communications, an ethernet network interface controller (NIC) is initialized with a high interrupt priority.

VBD defines the configuration of the communication controller according to the selections made by the client application that requested the services.

When a Windows application requests VBD services, the selected Windows communication resource is dynamically reconfigured to match the configuration specified.

Engage Flow Control

VBD uses hardware flow control. Flow control is used by a receiving system to signal the sending system to temporarily stop sending. The hardware flow control that VBD uses is based on a request to send/clear to send (RTS/CTS) protocol. If the connection between the two machines is via a null modem cable, then RTS on one end of the cable is wired to CTS on the other end and vice versa. If the connection between the two machines is via two modems, the modems must offer the ARQ feature, and ARQ must be turned on (ARQ causes RTS from one system to be passed through the link and end up as CTS at the other end). The receiving system has control over whether RTS is high or low. RTS maps to CTS at the sending end, and the sending end is responsible for examining the state of CTS prior to sending any characters. If CTS is low, the sender does not send any waiting characters but instead waits until CTS goes high again. If CTS is high, the sender has permission from the receiver to send data.

Select Protocol

VBD is protocol independent. It supports multiple modes of operations to facilitate both "streaming" and "packet" type protocols. Specifically, in the "streaming" mode, the entire data pipeline is devoted to either upload/sending or download/receiving data. This protocol is typically used for audio/video data. In a "packet" mode the data pipeline is divided in half to manage both upload/send and download/receive types of data in their respectively allocated sections of the data pipeline.

Load Streaming Pipeline

The Streaming Pipeline consists of hardware and software resources as follows:

Buffer Memory, e.g., RAM

Controller Memory, e.g., FIFO

Interrupt Service Routines

Device Driver Exported Services

Streaming mode utilizes the entire buffer memory to provide maximum attainable throughput. Buffer memory is allocated in pages (4096 bytes) because Windows is tuned to function optimally with data organized in block of pages in size. This essentially transforms the Win16 and Win32 Windows communications API into a much faster block rather than byte type I/O operation. In addition, the occurrence of interrupt saturation is reduced because significantly fewer interrupts are needed to manage data in blocks than in bytes. Controller memory is only used in polled mode to increase performance by ensuring that the system never waits for data to be received and is not prevented from sending data via controller memory. The communication pipeline is always full in both directions.

Load Packet Pipeline

The packet pipeline consists of hardware and software resources as follows:

Buffer Memory, e.g., RAM

Controller Memory, e.g., FIFO

Interrupt Service Routines

Device Driver Exported Services

Packet mode utilizes partition-in-two of the buffer memory to obtain the maximum attainable client/server throughput. Buffer memory is allocated in pages (4096 bytes) because, as discussed above, Windows is tuned to function optimally with data organized in blocks equaling pages in size. This essentially transforms the Win16 and Win32 Windows communications API into a block rather than byte type I/O operation. In addition, the occurrence of interrupt saturation is reduced because significantly fewer interrupts are needed to manage data in blocks than bytes. Controller memory is only used in polled mode to increase performance by ensuring that the system never waits for data to be received and is not prevented from sending data via Controller Memory. The communication pipeline is always full in both directions.

Select Bit Mode

The Windows communications resource API services 16-bit (Win16) and 32-bit (Win32) applications in fundamentally different ways. VBD accommodates both 16-bit and 32-bit applications by switching from one mode to another as directed by the application.

16-bit Cooperative Interrupt Management

The VBD virtualizes Windows communications resources bandwidth by exporting its VxD services with an API. The device driver provides services that applications can use to increase communications speed. Cooperative interrupt management allows each device to capture and hold the communications resource until the data transfer has been completed.

The VBD API provides services for Ring-3 components. To obtain the VBD API entry point, an application first calls get device entry point address (Interrupt 2Fh, Function 1684 h).

The VBD API exports the following services:

VBD_Get_Version

VBD_Sign_on

VBD_Upload

VBD_Download
VBD_Send_Modem_Command
VBD_Set_Upload_Mode
VBD_Set_Download_Mode
VBD_Sign_Off
VBD_Get_Communication_Area
VBD_Get_Statistics
VBD_Set_Packet_Mode
VBD_Set_Streaming_Mode
VBD_File_Transfer_Complete
VBD_Register_Message
VBD_Post_Message 32-bit Preemptive Interrupt Management In 32-bit systems and applications, preemptive interrupt management by VBD allows higher priority devices to request, capture, and hold control over low priority devices.

Exported Services

Prior to invoking VCOMM Services, each request by a Win-16 or Win-32 application is inspected to determine when and how VBD needs to intervene. A conditional branch determines whether to map VCOMM services to VBD services, or to direct use of the API by VBD services.

Map Communications Manager to VBD Services

The following three tables represent the VCOMM Services mapped to VBD Services:

```
Begin_Service_Table VWIN32
    VWIN32_Service    VWIN32_Get_Version, LOCAL
    VWIN32_Service    VWIN32_DIOCCompletionRoutine,
                      LOCAL
    VWIN32_Service    VWIN32_QueueUserApc
    VWIN32_Service    VWIN32_Get_Thread_Context
    VWIN32_Service    VWIN32_Set_Thread_Context
    VWIN32_Service    VWIN32_CopyMem, LOCAL
    VWIN32_Service    VWIN32_Npx_Exception
    VWIN32_Service    VWIN32_Emulate_Npx
    VWIN32_Service    VWIN32_CheckDelayedNpxTrap
    VWIN32_Service    VWIN32_EnterCrstRO
    VWIN32_Service    VWIN32_LeaveCrstRO
    VWIN32_Service    VWIN32_FaultPopup
    VWIN32_Service    VWIN32_GetContextHandle
    VWIN32_Service    VWIN32_GetCurrentProcessHandle,
                      LOCAL
    VWIN32_Service    VWIN32_SetWin32Event
    VWIN32_Service    VWIN32_PulseWin32Event
    VWIN32_Service    VWIN32_ResetWin32Event
    VWIN32_Service    VWIN32_WaitSingleObject
    VWIN32_Service    VWIN32_WaitMultipleObjects
    VWIN32_Service    VWIN32_CreateRing0Thread
    VWIN32_Service    VWIN32_CloseVxDHandle
    VWIN32_Service    VWIN32_ActiveTimeBiasSet, LOCAL
    VWIN32_Service    VWIN32_GetCurrentDirectory, LOCAL
    VWIN32_Service    VWIN32_BlueScreenPopup
    VWIN32_Service    VWIN32_TerminateApp
    VWIN32_Service    VWIN32_QueueKernelAPC
    VW1N32_Service    VWIN32_SysErrorBox
```

```
Begin_Service_Table VCOMM, VxD
    VCOMM_Service    VCOMM_Get_Version, LOCAL
    VCOMM_Service    VCOMM_Register_Port_Driver, LOCAL
    VCOMM_Service    VCOMM_Acquire_Port, LOCAL
    VCOMM_Service    VCOMM_Release_Port, LOCAL
    VCOMM_Service    VCOMM_OpenComm, VxD_CODE
    VCOMM_Service    VCOMM_SetCommState, VxD_CODE
    VCOMM_Service    VCOMM_GetCommState, VxD_CODE
    VCOMM_Service    VCOMM_SetupCommState, VxD_CODE
    VCOMM_Service    VCOMM_TransmitCommChar,, VxD_CODE
    VCOMM_Service    VCOMM_CloseComm, VxD_CODE
    VCOMM_Service    VCOMM_GetCommQueueStatus, VxD_CODE
    VCOMM_Service    VCOMM_ClearCommError, VxD_CODE
    VCOMM_Service    VCOMM_GetModemStatus, VxD_CODE
    VCOMm_Service    VCOMM_ClearCommError, VxD_CODE
    VCOMM_Service    VCOMM_GetModemStatus, VxD_CODE
    VCOMM_Service    VCOMM_ClearCommError, VxD_CODE
    VCOMM_Service    VCOMM_GetModemStatus, VxD_CODE
    VCOMM_Service    VCOMM_GetCommProperties, VxD_CODE
    VCOMM_Service    VCOMM_EscapeCommFunction, VxD_CODE
    VCOMM_Service    VCOMM_PurgeComm, VxD_CODE
    VCOMM_Service    VCOMM_SetCommEventMask, VxD_CODE
    VCOMM_Service    VCOMM_GetCommEventMask, VxD_CODE
    VCOMM_Service    VCOMM_WriteComm, VxD_CODE
    VCOMM_Service    VCOMM_ReadComm, VxD_CODE
    VCOMM_Service    VCOMM_EnableCommNotification, VxD_CODE
    VCOMM_Service    VCOMM_GetLastError, VxD_CODE
    VCOMM_Service    VCOMM_Steal_Port, LOCAL
    VCOMM_Service    VCOMM_SetReadCallBack, VxD_CODE
    VCOMM_Service    VCOMM_SetWriteCallBack, VxD_CODE
    VCOMM_Service    VCOMM_Add_Port, LOCAL
    VCOMM_Service    VCOMM_GetSetCommTimeouts, VxD_CODE
    VCOMM_Service    VCOMM_SetWriteRequest, VxD_CODE
    VCOMM_Service    VCOMM_SetReadRequest, VxD_CODE
    VCOMM_Service    VCOMM_Dequeue_Request, VxD_CODE
    VCOMM_Service    VCOMM_Enumerate_DevNodes, VxD_CODE
    VCOMM_Service    VCOMM_Map_Win32DCB_ToRing0, VxD_CODE
    VCOMM_Service    VCOMM_Map_Ring0DCB_To_Win32, VxD_CODE
    VCOMM_Service    VCOMM_Get_Contention_Handler, VxD_CODE
    VCOMM_Service    VCOMM_Map_Name_To_Resource
End_Service_Table VCOMM, VxD
```

-continued

| | |
|---|---|
| VWIN32_Service | VWIN32_IsClientWin32 |
| VWIN32_Service | VWIN32_IFSRIPWhenLev2Taken, LOCAL |
| End_Service_Table VWIN32 | |

| | |
|---|---|
| Begin_WIN32_Services VCOMM | |
| VCOMM_Win32_Service | VCOMMGetVersion |
| VCOMM_Win32_Service | VCOMMOpenComm |
| VCOMM_Win32_Service | VCOMMSetupComm |
| VCOMM_Win32_Service | VCOMMEscapeCommFunction |
| VCOMM_Win32_Service | VCOMMGetCommMask |
| VCOMM_Win32_Service | VCOMMGetCommProp |
| VCOMM_Win32_Service | VCOMMGetCommState |
| VCOMM_Win32_Service | VCOMMGetCommTimeouts |
| VCOMM_Win32_Service | VCOMMPurgeComm |
| VCOMM_Win32_Service | VCOMMSetCommMask |
| VCOMM_Win32_Service | VCOMMSetCommState |
| VCOMM_Win32_Service | VCOMMSetCommTimeouts |
| VCOMM_Win32_Service | VCOMMTransmitCommChar |
| VCOMM_Win32_Service | VCOMMWaitCommEvent |
| VCOMM_Win32_Service | VCOMMGetCommModemStatus |
| VCOMM_Win32_Service | VCOMMWriteComm |
| VCOMM_Win32_Service | VCOMMReadComm |
| VCOMM_Win32_Service | VCOMMClearCommError |
| VCOMM_Win32_Service | VCOMMCloseComm |
| VCOMM_Win32_Service | VCOMMGetLastError |
| VCOMM_Win32_Service | _VCOMMDequeueRequest |
| VCOMM_Win32_Service | _VCOMMQueryFriendlyName |
| VCOMM_Win32_Service | _VCOMMGetCommConfig |
| VCOMM_Win32_Service | _VCOMMSetCommConfig |
| VCOMM_Win32_Service | _VCOMMGetWin32Error |
| VCOMM_Win32_Service | _VCOMMFlushFileBuffers |
| VCOMM_Win32_Service | _VCOMMDeviceIOControl |
| End_Win32_ServicesVCOMM | |

Direct Use of Application Program Interface (API) to VBD Services

| | |
|---|---|
| Begin_Service_Table VBD,VxD | |
| VBD_Service | VBD_Get_Version, LOCAL |
| VBD_Service | VBD_Sign_on, LOCAL |
| VBD_Service | VBD_Upload, LOCAL |
| VBD_Service | VBD_Download, LOCAL |
| VBD_Service | VBD_Send_Modem_Command, LOCAL |
| VBD_Service | VBD_Set_Upload_Mode, LOCAL |
| VBD_Service | VBD_Set_Download_Mode, LOCAL |
| VBD_Service | VBD_Sign_Off, LOCAL |
| VBD_Service | VBD_Get_Communication_Area, LOCAL |
| VBD_Service | VBD_Get_Statistics, LOCAL |
| VBD_Service | VBD_Set_Packet_Mode, LOCAL |
| VBD_Service | VBD_Set_Streaming_Mode, LOCAL |
| VBD_Service | VBD_File_Transfer_Complete, LOCAL |
| VBD_Service | VBD_Register_Message, LOCAL |
| VBD_Service | VBD_Post_Message, LOCAL |
| End_Service_Table VBD,VxdD | |

Execute Data Transfer

VBD data transfer can be provided for any Windows communications resource via the VBD API or VCOMM extension. In both cases, VBD manages and controls the data transmission and reception process from initiation to completion, notifying the application upon completion of a successful data transfer.

Exported Services

Post VCOMM Services processing involves controlling how results of VBD intervention is communicated to Win16 and Win32 applications. A conditional branch returns control to either VCOMM or the Windows application.

Return to Communications Manager

Control is returned to VCOMM for additional communication functions. Absolute adherence to Windows guidelines is maintained for system integrity with respect to bit ordering, context, and signaling conventions in the VBD interface to VCOMM.

Return to Application

Control is returned to the Windows application. The VBD API strictly follows the Windows guidelines for exporting Device Driver Services to Win16 and Win32 applications.

The transfer of data in many different types of computer-to-computer communication systems may be advantageously speeded up by implementing the present invention. Those include, but are not limited to, wireless connections as suggested by reference characters 74 a–h in FIG. 1 and null modem connections. Therefore, the present embodiment is to be considered in all respects as illustrative and not restrictive, the scope of the invention being indicated by the appended claims rather than by foregoing description; and all changes which come within the meaning and range of equivalency of the claims are therefore intended to be embraced therein.

What is claimed is:

1. A method of I/O management in a computer system, said method comprising the steps of:

identifying an I/O device to be managed;

identifying a first device within the system which generates interrupts at a base frequency with those interrupts being handled before any interrupts conventionally generated by the I/O device are handled;

increasing the frequency at which the first device generates interrupts;

mapping a new event handler to the interrupts of the first device;

using the newly mapped event handler to determine whether data needs to be transferred to and/or from the I/O device when said I/O device requires service; and using the newly mapped event handler to replace execution of any handler conventionally mapped to the interrupts of the first device at the time the newly mapped event handler was mapped to the interrupts of the first device.

* * * * *